United States Patent
Feng et al.

(10) Patent No.: US 8,729,844 B2
(45) Date of Patent: May 20, 2014

(54) POWER CONVERTER WITH ASYMMETRIC PHASE SHIFT AUTOTRANSFORMER FOR ALTERNATING CURRENT (AC) MOTOR

(75) Inventors: Frank Z. Feng, Loves Park, IL (US); Dwight D. Schmitt, Rockford, IL (US); Mark W. Metzler, Davis, IL (US); Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 242 days.

(21) Appl. No.: 13/352,658

(22) Filed: Jan. 18, 2012

(65) Prior Publication Data

US 2013/0181643 A1    Jul. 18, 2013

(51) Int. Cl.
*H02P 27/00*    (2006.01)

(52) U.S. Cl.
USPC ........ 318/400.3; 318/105; 318/778; 318/801; 318/807

(58) Field of Classification Search
USPC ................ 318/400.3, 105, 778, 801, 807
See application file for complete search history.

(56) References Cited

U.S. PATENT DOCUMENTS

| | | | |
|---|---|---|---|
| 3,577,052 A * | 5/1971 | Bauer | 318/798 |
| 4,967,334 A * | 10/1990 | Cook et al. | 363/34 |
| 5,013,929 A * | 5/1991 | Dhyanchand | 290/31 |
| 5,015,941 A * | 5/1991 | Dhyanchand | 322/10 |
| 5,905,642 A * | 5/1999 | Hammond | 363/37 |
| 6,249,443 B1 | 6/2001 | Zhou et al. | |
| 6,278,254 B1 * | 8/2001 | Harkey | 318/778 |
| 6,335,872 B1 | 1/2002 | Zhou et al. | |
| 6,807,361 B1 | 10/2004 | Girgensohn et al. | |
| 6,995,993 B2 * | 2/2006 | Sarlioglu et al. | 363/44 |
| 7,005,829 B2 * | 2/2006 | Schnetzka | 318/801 |
| 7,274,280 B1 | 9/2007 | Paice | |
| 7,619,906 B2 * | 11/2009 | Schnetzka | 363/34 |
| 7,750,782 B1 | 7/2010 | Paice | |
| 7,796,413 B2 | 9/2010 | Furmanczyk | |
| 8,115,444 B2 * | 2/2012 | De et al. | 318/801 |
| 2005/0077887 A1 * | 4/2005 | Sarlioglu et al. | 323/361 |
| 2005/0122752 A1 * | 6/2005 | Schnetzka | 363/50 |
| 2006/0196203 A1 * | 9/2006 | Schnetzka et al. | 62/228.4 |
| 2007/0278988 A1 * | 12/2007 | De et al. | 318/801 |
| 2008/0186749 A1 | 8/2008 | Blanchery | |
| 2010/0176755 A1 * | 7/2010 | Hoadley et al. | 318/105 |
| 2010/0327799 A1 * | 12/2010 | Broussard et al. | 318/807 |
| 2011/0051480 A1 | 3/2011 | Blanchery | |

* cited by examiner

*Primary Examiner* — Paul Ip
(74) *Attorney, Agent, or Firm* — Kinney & Lange, P.A.

(57) ABSTRACT

An AC-AC power converter supplies AC power to an AC motor having a plurality of motor windings and a case connected to a ground. The AC-AC power converter architecture includes an asymmetric phase shift autotransformer/rectifier unit (ATRU) that converts an AC input to a DC output, wherein the asymmetric phase shift ATRU generates a common-mode AC voltage across the asymmetric phase shift ATRU. The common mode voltage is diverted to ground through motor case parasitic capacitance via a common-mode voltage pull-down circuit connected between each phase of the ATRU AC input and the ground.

14 Claims, 4 Drawing Sheets

US 8,729,844 B2

POWER CONVERTER WITH ASYMMETRIC PHASE SHIFT AUTOTRANSFORMER FOR ALTERNATING CURRENT (AC) MOTOR

BACKGROUND

The present invention is related to power conversion, and in particular to AC-AC power converters for driving electric motors.

In many applications (e.g., aircraft applications) AC-AC converters are employed to drive an electric alternating current (AC) motor that is used as the prime mover for a specified mechanical load. In these applications, the AC motor and motor controller can be integrated into a single unit to form an integrated system. To meet AC input power quality and electromagnetic interference (EMI) requirement, an autotransformer rectifier unit (ATRU) and power quality EMI filter are provided at a front end that filters an AC input and converts the AC input to a DC output. A DC-AC converter (inverter) converts the DC output to an AC output for supply to the AC motor.

In aircraft applications, as well as others, the weight of a system has a direct influence on the overall cost of the system. The weight of the autotransformer is a function of the relative power rating of the transformer. A higher relative power rating results in a weight penalty.

SUMMARY

An AC-AC power converter supplies AC power to an AC motor having a plurality of motor windings and a case connected to a ground. The AC-AC power converter architecture includes an asymmetric phase shift autotransformer/rectifier unit (ATRU) that converts an AC input to a DC output, wherein the asymmetric phase shift ATRU generates a common-mode AC voltage across the asymmetric phase shift ATRU. The common mode voltage is diverted to ground through motor case parasitic capacitance via a common-mode voltage pull-down circuit connected between each phase of the ATRU AC input and the ground.

DETAILED DESCRIPTION

Figure 1:
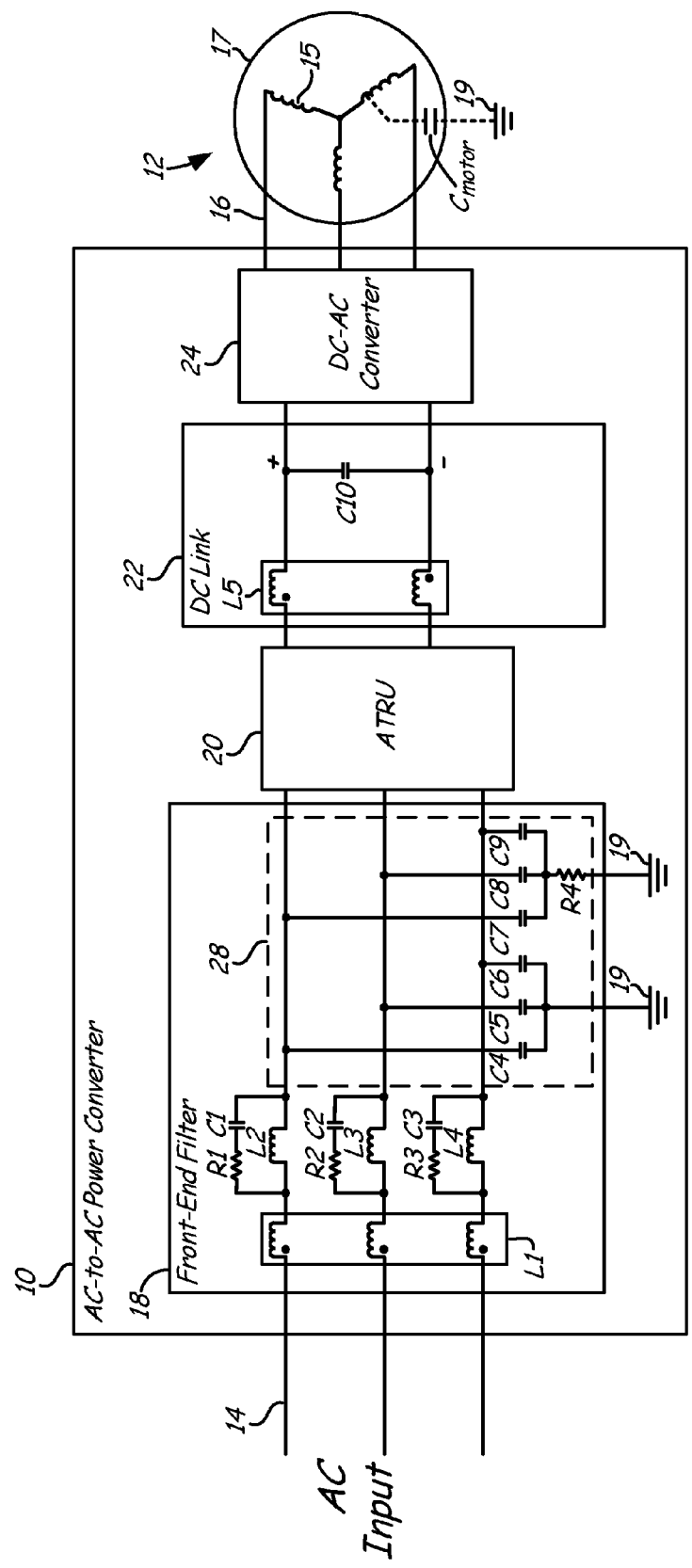
FIG. 1 is a block diagram of an AC-AC power converter connected to supply power to an alternating current (AC) motor according to an embodiment of the present invention.

FIG. 1 is a block diagram of AC-AC power converter 10 connected to supply power to a low-voltage alternating current (AC) motor 12 according to an embodiment of the present invention. AC motor 12 includes a plurality of motor windings 15 and motor case 17, with parasitic capacitance $C_{motor}$ formed between motor windings 15 and motor case 17 connected to ground 19.

Power converter 10 is an AC-to-AC power converter that converts three-phase AC input 14 (referred to as main, or line power) to a controlled/regulated three-phase AC output 16 supplied to AC motor 12. In particular, power converter 10 includes front-end filter 18, autotransformer rectifier unit (ATRU) 20, DC link 22, and DC-AC converter 24. Front-end filter 18 includes a plurality of passive filter components; including common mode inductor L1, AC differential mode inductors L2, L3, and L4, capacitors C1, C2, and C3, and resistors R1, R2, and R3. In the embodiment shown in FIG. 1, common mode inductor L1 is connected to each phase of AC input 14, in series with differential mode inductors L2, L3, L4 connected to respective phases of AC input 14. Connected in parallel with each differential mode inductors L2, L3, and L4 is a series combination of resistor (R1, R2, or R3) and capacitor (C1, C2, or C3). These passive components act to filter unwanted harmonics generated by ATRU 20 and DC-AC converter 24 from being propagated onto AC input 14. The size of passive components employed by front-end filter 18 are selected to meet desired power quality and EMI requirements.

In addition, front-end filter 18 includes common-mode voltage pull-down circuit 28 that includes capacitors C4, C5, C6, C7, C8, and C9 and resistor R4 connected between the filtered AC outputs of front-end filter 18 and ground 19. As discussed in more detail with respect to ATRU 20, circuit 28 diverts common-mode voltage generated by ATRU 20 to motor parasitic capacitance $C_{motor}$ associated with AC motor 12.

ATRU 20 converts the AC input provided by front-end filter 18 to a DC output provided to DC-AC converter 24 via DC link 22. The rectified output provided by ATRU 20 is provided to DC link 22, which includes DC differential mode inductor L5 and capacitor C10 for smoothing the rectified output generated by ATRU 20. DC-AC converter 24 converts DC output provided by DC link 22 to a three-phase AC output 16 that is supplied to windings 15 of AC motor 12. The exemplary embodiment reduces harmonics while minimizing the weight associated with AC-AC power converter 10 by minimizing the weight associated with power quality EMI filter 18 and weight associated with ATRU 20.

Figure 2:
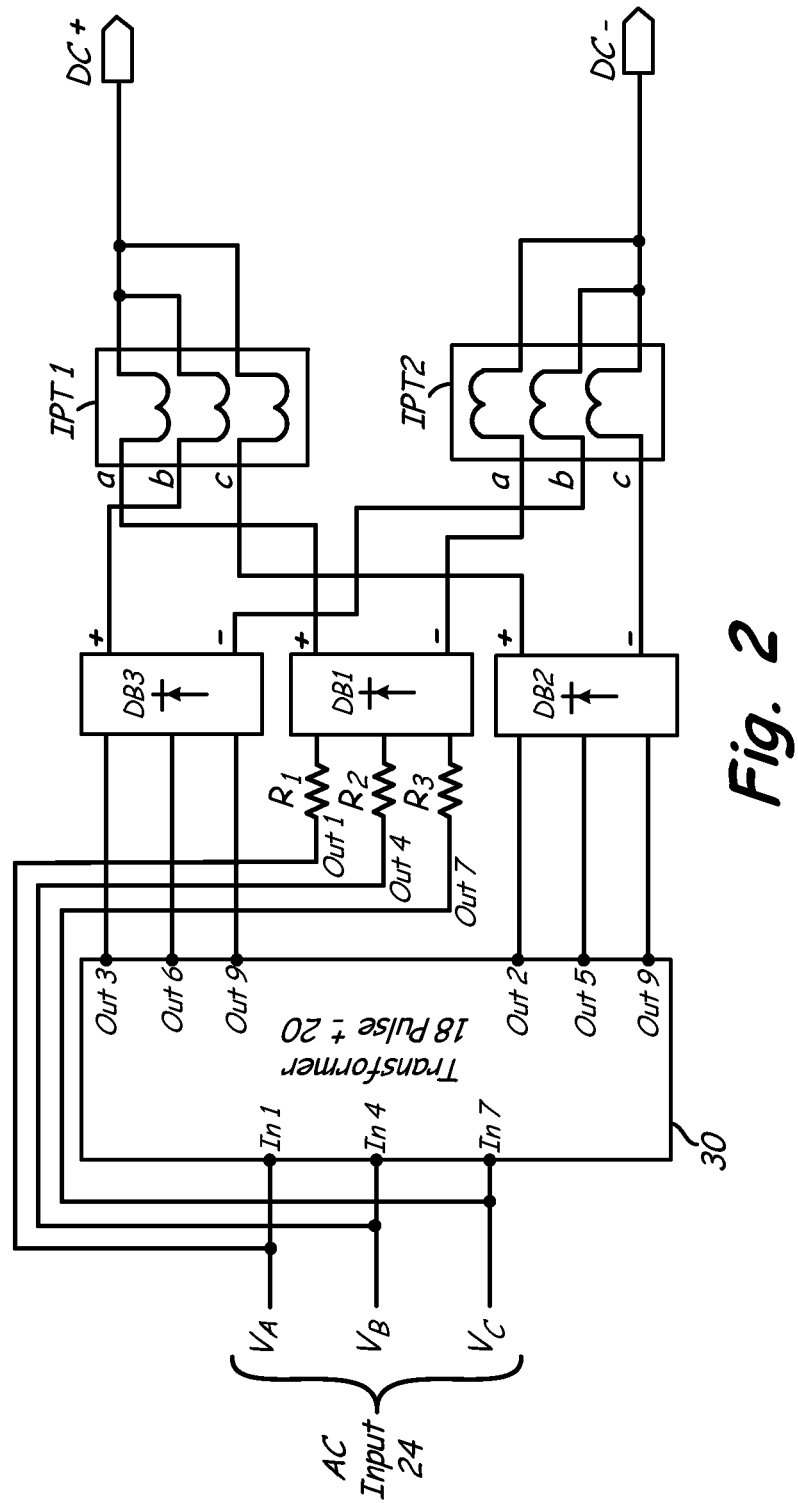
FIG. 2 is a circuit diagram of an autotransformer employed by the AC-AC power converter according to an embodiment of the present invention.
Figure 3:
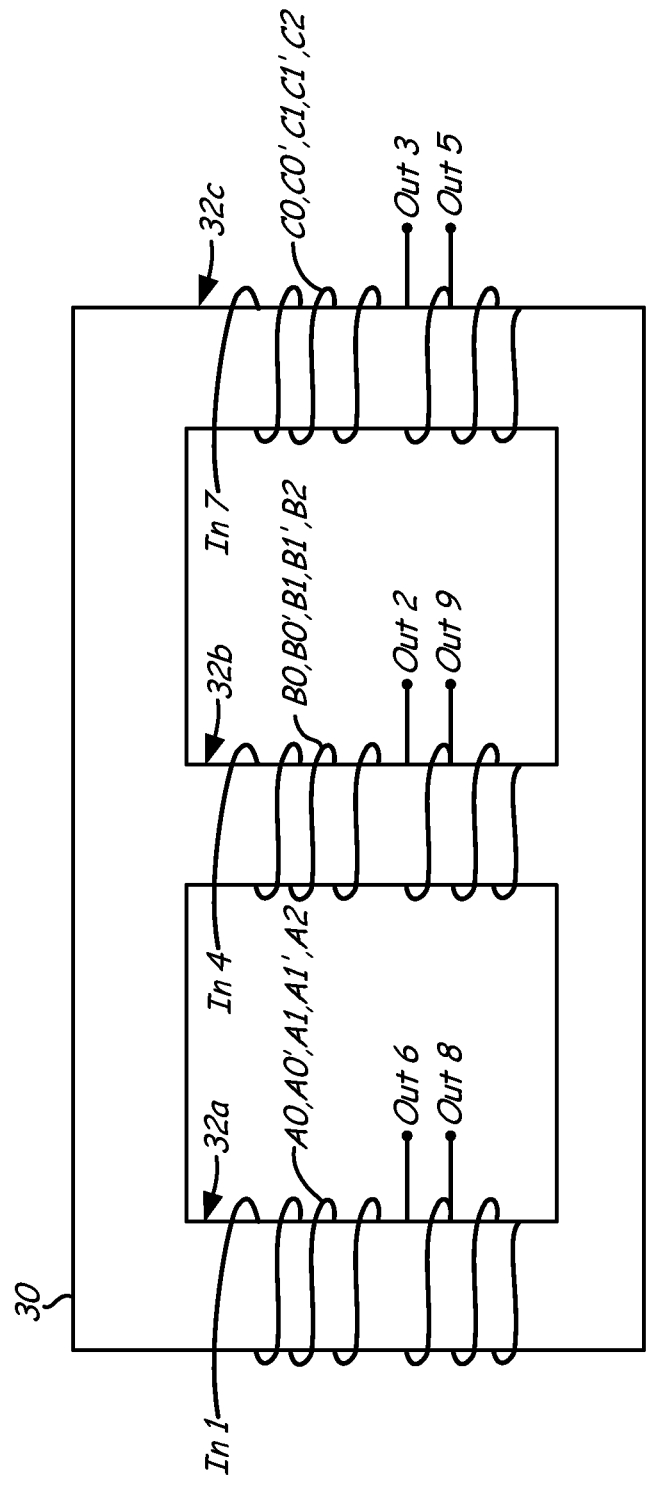
FIG. 3 is a simple cross-sectional view of a low-voltage autotransformer unit according to an embodiment of the present invention.
Figure 4:
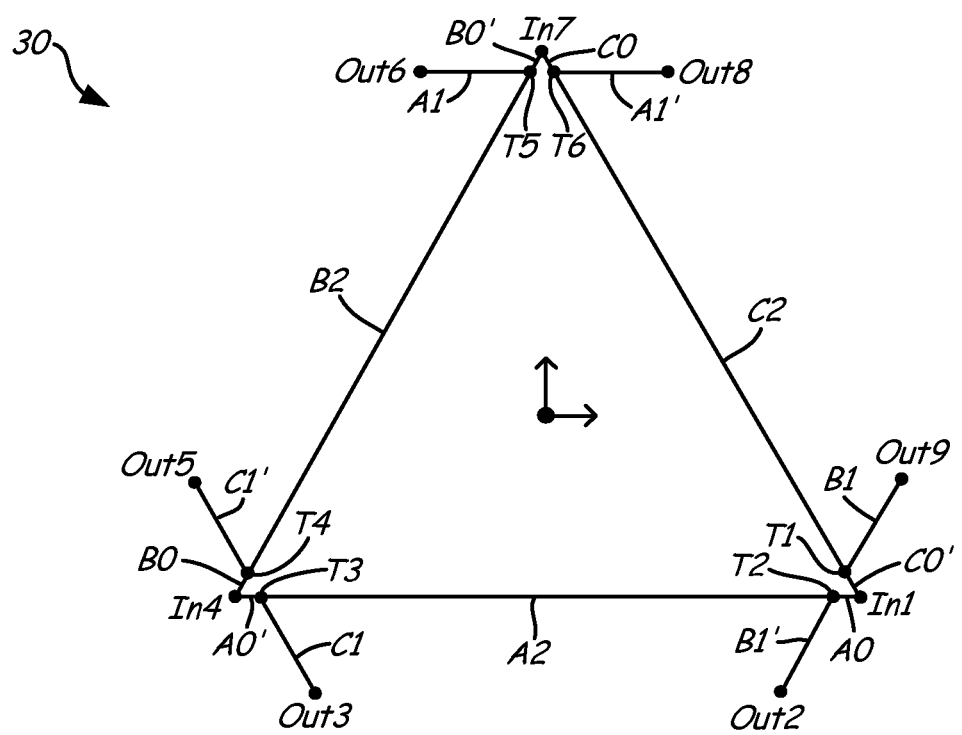
FIG. 4 is a phase diagram of an autotransformer employed by the AC-AC power converter according to an embodiment of the present invention.

As described in more detail with respect to FIGS. 2-4, ATRU 20 includes an asymmetrical phase shift autotransformer and a rectifier unit. Asymmetries in the autotransformer reduce the weight of the autotransformer, but also the relative power rating of the autotransformer. The reduced relative power rating results in a lower DC output voltage being provided by ATRU 20 than in a typical ATRU employing a symmetrical phase shift autotransformer. To accommodate the lower power rating, a higher input voltage is required or selection of an output load having lower voltage requirements (i.e., AC motor 12). For example, in one embodiment AC motor 12 is a low-voltage AC motor selected for use in conjunction with power converter 10. In addition, the asymmetrical autotransformer generates common-mode voltages across the ATRU from AC input to DC output. To accommodate the common mode AC voltage without increasing the size of filter components, power quality EMI filter 18 is connected via pull-down components 28 to ground 19, which is also connected to case 17 of AC motor 12. In the embodiment shown in FIG. 1, pull-down components 28 include capacitance and resistive elements, but in other embodiments may include other passive filtering components connected to filter common-move voltages in conjunction with the parasitic motor capacitance $C_{motor}$.

FIG. 2 is a circuit diagram of low-voltage autotransformer/rectifier unit (ATRU) 20 employed by AC-AC power converter 10 according to an embodiment of the present invention. ATRU 20 includes eighteen pulse±20° autotransformer 30 (hereinafter, "autotransformer 30"), diode bridge (DB) rectifiers DB1, DB2, and DB3, and interphase transformers IPT1 and IPT2.

Autotransformer 30 includes first AC input terminals In1, In4, In7. Each of the labeled input terminals represents a terminal connection point to the windings associated with autotransformer 30 and are labeled with non-consecutive numbers to simplify the discussion of the vector diagram shown in FIG. 3. The location of terminals associated with first AC input terminal In1, In4, In7 are described in the phase diagram shown in FIG. 4. The first AC input terminals In1, In4, In7 are connected directly to a first group of output terminals Out1, Out4, Out7 connected to resistors R1, R2, and R3. First AC input terminals In1, In4, In7 are connected to receive AC power labeled Va, Vb, Vc, respectively. For example, in an aircraft application AC power labeled Va, Vb, Vc may be 230 Volt (V) AC power provided by an on-board generator.

Autotransformer 30 includes two additional groups of output terminals, including a first group comprised of output terminals Out3, Out6, Out9 (once again labeled non-consecutively to aid in understanding the vector diagram shown in FIG. 3) and a second group comprised of output terminals Out2, Out5, and Out8. Output terminals Out3, Out6, and Out9 provide AC outputs phase-shifted to lead the AC input provided at input terminals In1, In4, and In7, while output terminals Out2, Out5, and Out8 provide AC outputs phase-shifted to lag the AC input provided at input terminals, In1, In4, and In7. Output terminals Out3, Out6, and Out9 are connected to diode bridge DB3. Output terminals Out2, Out5, Out8 are connected to diode bridge DB2. Input terminals In1, In4, In7 are connected to diode bridge DB1 via resistors R1, R2, and R3 in a configuration that bypasses autotransformer 30. Resistors R1, R2, and R3 are sized to match the resistance of windings associated with autotransformer 30 to balance output impedance of the outputs provided to diode bridges DB1, DB2 and DB3.

Diode bridges DB1, DB2, and DB3 convert the received AC inputs to a DC output having a positive component and a negative component. The positive DC output provided by each diode bridge DB1, DB2, and DB3 is provided to interphase transformer IPT1, which provides an output that is combined to generate the positive DC output DC+. Likewise, the negative DC output provided by each diode bridge DB1, DB2, and DB3 is provided to interphase transformer IPT2, which provides an output that is combined to generate the negative DC output DC−. Diode bridge circuits DB1, DB2, and DB3 generate a low-frequency high magnitude common mode voltage as a byproduct of the asymmetrical phase shift provided by autotransformer 30. As discussed above, this common mode voltage is addressed by connecting power quality and EMI filter 18 to ground 19 associated with AC motor 12 to dissipate the common mode voltage through a capacitance Cmotor formed between motor windings 15 of AC motor 12 and motor case 17 (shown in FIG. 1).

In one embodiment, autotransformer 30 provides a 1:1 ratio of input voltage to output voltage (i.e., no stepping up or stepping down of voltage), although in other embodiments the voltage may be stepped up or down as required.

FIG. 3 is a simple cross-sectional view of low-voltage autotransformer unit 30 according to an embodiment of the present invention. Each phase leg 32a, 32b, and 32c is associated with one phase of the three-phase AC input provided to autotransformer 30. For example, AC input voltage Va provided to autotransformer 30 at input terminal In1 is provided to coils wound around phase leg 32a. Likewise, AC input voltage Vb provided to autotransformer 30 at input terminal In2 is provided to coils wound around phase leg 32b, and AC input voltage Vc provided at input terminal In3 is provided to coils wound around phase leg 32c.

Each phase leg 32a, 32b and 32c includes a plurality of coils wrapped around the phase leg in a configuration illustrated in more detail with respect to the phase diagram shown in FIG. 4. In the embodiment shown in FIG. 3, five coils are associated with each separate phase leg 32a, 32b, and 32c. For example, coils A0, A0', A1, A1' and A2 are wrapped around phase leg 32a, coils B0, B0', B1, B1', and B2 are wrapped around phase leg 32b, and coils C0, C0', C1, C1', and C2. Autotransformer 30 includes nine output terminals with three output terminals being associated with each respective phase leg 32a, 32b, and 32c. For example, AC output terminals Out6 and Out8 are associated with phase leg 32a, output terminals Out2 and Out9 are associated with phase leg 32b, and output terminals Out3 and Out5 are associated with phase leg 32c.

The number of turns (i.e., length) of each coil is varied, and a plurality of interconnections internal to autotransformer 30 allow connections to be made between various coils on each of the three phase legs 32a, 32b, 32c. The number of coils, the turns of each coil, and the interconnection between various coils affects the performance of autotransformer 30. The simple cross-sectional view shown in FIG. 2 does not illustrate the plurality of coils associated with each phase leg, or the turns or various interconnections of the coils with one another. A particular configuration of the plurality of coils associated with each phase leg according to an embodiment of the present invention is illustrated in the vector diagram shown in FIG. 4.

FIG. 4 is a phase diagram of an autotransformer employed by the AC-AC power converter according to an embodiment of the present invention. The phase shift between respective output terminals is illustrated by the angle measured between two output terminals based on point n (located in the middle of the triangular shape). For example, the phase shift between output terminal Out6 and input terminal In7 (which as shown in FIG. 2 is connected directly to diode bridge DB1 in bypass of autotransformer 30) is 20°. Similarly, the phase shift between input terminal In7 and output terminal Out8 is 20°. In contrast, a symmetrical autotransformer employs a phase shift of 40° between terminals.

The vector diagram shown in FIG. 4 illustrates schematically the electrical configuration of coils in autotransformer 30. In particular, all straight line arrows in the vector diagram represent coils, with the length of the straight line arrow being proportional to the number of winding turns of the coil. All lines of the same orientation represent a same phase of the three-phase input provided to autotransformer 30. Output terminals for connection to one of the diode bridge rectifiers DB1, DB2, or DB3 are denoted with black dots and are labeled Out2, Out3, Out5, Out6, Out8, and Out9. Internal connections within autotransformer are denoted with circles and are labeled internal terminals T1-T6. Each winding connected between either output terminals Out1-Out9 or internal terminals T1-T9 is denoted with a coil number. For example, coils associated with phase leg 32a includes coils A0, A0', A1, A1', and A2, while coils associated with phase leg 32b include coils B0, B0', B1, B1', and B2 and coils associated with phase leg 32c includes coils C0, C0', C1, C1', and C2. The orientation of the lines representing each of the windings is dictated by the phase of the winding. For example, all coils associated with phase leg 32a (e.g., coils A0, A0', A1, A1', and A2) lie in the same orientation, with the same holding true for all coils associated with phase legs 32b and 32c, respectively. The phase difference or angle between the AC inputs Va, Vb, Vc provided to first AC input terminals In1, In4, In7 is 120°, respectively.

In the embodiment shown in FIG. 4, first AC input terminals In1, In4, In7 form the corners of a triangle. Coils A0, A2 and A0' are connected in series with one another between input terminal In1 and In4 via internal terminals T2 and T3. Likewise, coils B0, B2, and B0' are connected in series between input terminals In4 and In7 via internal terminals T4 and T5 and coils C0, C2 and C0' are connected in series between input terminals In7 and In1 via the plurality of internal terminals C0, C2 and C0'. Coils A0 and C0' are connected together at input terminal In1, which is connected to AC input voltage Va Likewise, coils B0 and A0' are connected together at input terminal In2, which is connected to AC input voltage Vb, and coils C0 and B0' are connected together at input terminal In3, which is connected to AC input voltage Vc.

In the embodiment shown in FIG. 4, connection to each of the plurality of output terminals is as follows. Coil A0 is connected between input terminal In1 and internal terminal T2. Coil B1' is connected between internal terminal T2 and output terminal Out2. Coil A2 is connected between internal terminal T2 and internal terminal T3. Coil C1 is connected between internal terminal T3 and output terminal Out3. Coil A0' is connected between internal terminal T3 and input terminal In4. Coil B0 is connected between input terminal In4 and internal terminal T4. Coil C1' is connected between internal terminal T4 and output terminal Out5. Coil B2 is connected between internal terminal T4 and internal terminal T5. Coil A1 is connected between internal terminal T5 and output terminal Out6. Coil B0' is connected between internal terminal T5 and input terminal In7. Coil C0 is connected between input terminal In7 and internal terminal T6. Coil A1' is connected between internal terminal T6 and output terminal Out8. Coil C2 is connected between internal terminal T6 and internal terminal T1. Coil B1 is connected between internal terminal T1 and output terminal Out9. Coil C0' is connected between internal terminal T1 and input terminal In1.

The configuration of windings illustrated in FIG. 4 generates six phase-shifted outputs via output terminals Out2, Out3, Out5, Out6, Out8, and Out9 with three additional outputs being provided via direct connection to input terminals In1, In4, and In7 for a total of nine AC output provided to diode bridge rectifiers DB 1, DB2, and DB3. The AC outputs are divided into three groups; the AC outputs provided directly from AC input terminals In1, In4 and In7, the AC outputs provided via AC output terminals Out3, Out6, and Out9 that lead the first group, and the AC outputs provided via AC output terminals Out2, Out5, and Out8 that lag the first group.

The length or number of turns associated with each coil according to an embodiment of the present invention is provided below, along with the current relative to DC output provided with respect to each winding.

| Coil | Number of turns | Current Relative to DC Output |
|---|---|---|
| A0, B0, C0 | n0 | 0.289 |
| A0', B0', C0' | n0 | 0.273 |
| A1, B1, C1, | $n1 = \left[\frac{\sqrt{3} * \sin(\pi/9)}{4 * \sin(\pi/18)^2} - \frac{1}{2}\right] * n0$ | 0.272 |
| A1', B1', C1' | $n1 = \left[\frac{\sqrt{3} * \sin(\pi/9)}{4 * \sin(\pi/18)^2} - \frac{1}{2}\right] * n0$ | 0.272 |
| A2, B2, C2 | $n2 = \left[\frac{3}{4 * \sin(\pi/18)^2} - 2\right] * n0$ | 0.029 |

Due to the relatively low current relative to DC output provided in windings A2, B2, and C2 (which are the longest windings), the relative power rating associated with autotransformer 30 is lower than traditional symmetrical autotransformers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An AC-AC power converter architecture for supplying AC power to an AC motor having a plurality of motor windings and a case connected to a ground terminal, the AC-AC power converter architecture comprising:
    an asymmetric phase shift autotransformer/rectifier unit (ATRU) that converts an AC input to a DC output, wherein the asymmetric ATRU generates a common-mode AC voltage across the asymmetric ATRU, and wherein the asymmetric ATRU includes an asymmetric autotransformer;
    a DC-AC converter that converts the DC output to an AC output for supply to the AC motor; and
    a front-end filter connected to an input of the asymmetric ATRU to filter harmonics associated with the ATRU, wherein the front-end filter includes a common-mode pull-down voltage circuit connected between each phase of the AC input and the ground terminal connected to the case;
    wherein the asymmetric autotransformer provides six outputs that include a first group of AC outputs phase-shifted to lead the AC input voltages, and a second group of AC outputs phase-shifted to lag the AC input voltages.

2. The AC-AC power converter architecture of claim 1, wherein the common-mode voltage pull-down circuit utilizes a parasitic capacitance created between the plurality of motor windings and the case to dissipate the common-mode voltage generated by the asymmetric ATRU.

3. The AC-AC power converter architecture of claim 2, wherein the common-mode voltage pull-down circuit includes first, second and third capacitors connected between respective phases of the AC input and the ground terminal, and fourth, fifth, sixth capacitors connected between respective phases of the AC input and a series-connected resistor connected to the ground terminal.

4. The AC-AC power converter architecture of claim 1, wherein the first group of AC outputs are phase-shifted to lead the AC input voltages by 20°, and the second group of AC outputs are phase-shifted to lag the AC input voltages by 20°.

5. The AC-AC power converter architecture of claim 4, wherein the ATRU further includes:
   a first bridge rectifier for converting the filtered AC input provided by the front-end filter to a positive DC output and a negative DC output;
   a second bridge rectifier for converting the first group of AC outputs to a positive DC output and a negative DC output; and
   a third bridge rectifier for converting the second group of AC outputs to a positive and negative DC output.

6. The AC-AC power converter architecture of claim 4, wherein the ATRU includes:
   input terminals In1, In4, and In7 connected to the three-phase AC input voltage;
   a first plurality of coils A0, A0', A1, A1', and A2 wound on a first leg of the asymmetric autotransformer, connected to the input terminal In1 and output terminals Out6 and Out8, each coil of the first plurality of coils defined by a number of winding turns associated with the coil;
   a second plurality of coils B0, B0', B1, B1', and B2 wound on a second leg of the asymmetric autotransformer, connected to the input terminal In4 and output terminals Out2 and Out9, each coil of the second plurality of coils defined by a number of winding turns associated with the coil; and
   a third plurality of coils C0, C0', C1, C1', and C2 wound on a third leg of the asymmetric autotransformer, connected to the input terminal In7 and output terminals Out3 and Out5, each coil of the third plurality of coils defined by a number of winding turns associated with the coil; and
   a plurality of internal terminals T1-T6 for interconnecting the first, second and third plurality of coils in a desired configuration.

7. The AC-AC power converter architecture of claim 6, wherein the AC output provided at output terminal Out6 leads the AC output provided at the input terminal In7 by 20° and the AC output provided at output terminal Out8 lags the AC output provided at the input terminal In7 by 20°, the AC output provided at output terminal Out9 leads the AC output provided at the input terminal In1 by 20° and the AC output provided at output terminal Out2 lags the AC output provided at the input terminal In1 by 20°, and the AC output provided at output terminal Out3 leads the AC output provided at the input terminal In4 by 20° and the AC output provided at output terminal Out5 lags the AC output provided at the input terminal In4 by 20°.

8. The AC-AC power converter architecture of claim 7, wherein the coils A0, A2, and A0' are connected in series between input terminals In1 and In4 via internal terminals T2 and T3, coils B0, B2, and B0' are connected in series between input terminals In4 and In7 via internal terminals T4 and T5, and coils C0, C2, and C0' are connected in series between input terminals In7 and In1 via internal terminals T6 and T1, wherein coil A1 is connected between internal terminal T5 and output terminal Out6, coil A1' is connected between internal terminal T6 and output terminal Out8, coil B1 is connected between internal terminal T1 and output terminal Out9, coil B1' is connected between internal terminal T2 and output terminal Out2, coil C1 is connected between internal terminal T3 and output terminal Out3, coil C1' is connected between internal terminal T4 and output terminal Out5.

9. The AC-AC power converter architecture of claim 8, wherein the length of each of the first, second, and third plurality of coils is provided by the following table:

| Coil | Number of turns |
| --- | --- |
| A0, B0, C0 | n0 |
| A0', B0', C0' | n0 |
| A1, B1, C1, | $n1 = \left[\dfrac{\sqrt{3}*\sin\left(\frac{\pi}{9}\right)}{4*\sin\left(\frac{\pi}{18}\right)^2} - \dfrac{1}{2}\right]*n0$ |
| A1', B1', C1' | $n1 = \left[\dfrac{\sqrt{3}*\sin\left(\frac{\pi}{9}\right)}{4*\sin\left(\frac{\pi}{18}\right)^2} - \dfrac{1}{2}\right]*n0$ |
| A2, B2, C2 | $n2 = \left[\dfrac{3}{4*\sin\left(\frac{\pi}{18}\right)^2} - 2\right]*n0$ |

10. An asymmetric autotransformer/rectifier unit (ATRU) comprising:
    input terminals In1, In4, and In7 connected to the three-phase AC input voltage, wherein the three-phase AC input voltage is connected directly as an output of the asymmetric ATRU;
    output terminals Out2, Out3, Out5, Out6, Out8, and Out9 connected to provide AC output voltages;
    a first plurality of coils wound on a first leg of the autotransformer, connected to the input terminal In1 and output terminals Out6 and Out8, each coil of the first plurality of coils defined by a number of winding turns associated with the coil;
    a second plurality of coils wound on a second leg of the autotransformer, connected to the input terminal In4 and output terminals Out2 and Out9, each coil of the second plurality of coils defined by a number of winding turns associated with the coil; and
    a third plurality of coils wound on a third leg of the autotransformer, connected to the input terminal In7 and output terminals Out3 and Out5, each coil of the third plurality of coils defined by a number of winding turns associated with the coil; and
    a plurality of internal terminals T1-T6 for interconnecting the first, second and third plurality of coils in a desired configuration, wherein the asymmetric ATRU provides a first group of AC outputs provided at output terminals Out3, Out6, and Out9 that lag the three-phase AC input voltage provided directly as an output of the asymmetric ATRU, and second group of AC outputs provided at output terminals Out2, Out5, and Out8 that lead the three-phase AC input voltage provided directly as an output of asymmetric ATRU.

11. The asymmetric ATRU of claim 10, wherein the first plurality of coils includes coils A0, A0', A1, A1', and A2, the second plurality of coils includes coils B0, B0', B1, B1', and B2, and the third plurality of coils includes coils C0, C0', C1, C1', and C2.

12. The asymmetric ATRU of claim 11, wherein the first group of AC outputs provided at output terminals Out3, Out6, and Out9 lead the three-phase AC input voltages provided directly as an output of the asymmetric ATRU by 20°, respectively, and wherein the second group of AC outputs provided at output terminals Out2, Out5, and Out8 lag the three-phase AC input voltages provided directly as an output of the asymmetric ATRU by 20°.

13. The asymmetric ATRU of claim 12, wherein the coils A0, A2, and A0' are connected in series between input terminals In1 and In4 via internal terminals T2 and T3, coils B0, B2, and B0' are connected in series between input terminals In4 and In7 via internal terminals T4 and T5, and coils C0, C2, and C0' are connected in series between input terminals In7 and In1 via internal terminals T6 and T1, wherein coil A1 is connected between internal terminal T5 and output terminal Out6, coil A1' is connected between internal terminal T6 and output terminal Out8, coil B1 is connected between internal terminal T1 and output terminal Out9, coil B1' is connected between internal terminal T2 and output terminal Out2, coil C1 is connected between internal terminal T3 and output terminal Out3, coil C1' is connected between internal terminal T4 and output terminal Out5.

14. The asymmetric ATRU of claim 13, wherein the length of each of the first, second, and third plurality of coils is provided by the following table:

| Coil | Number of turns |
|---|---|
| A0, B0, C0 | n0 |
| A0', B0', C0' | n0 |
| A1, B1, C1, | $n1 = \left[ \dfrac{\sqrt{3} * \sin(\pi/9)}{4 * \sin(\pi/18)^2} - \dfrac{1}{2} \right] * n0$ |
| A1', B1', C1' | $n1 = \left[ \dfrac{\sqrt{3} * \sin(\pi/9)}{4 * \sin(\pi/18)^2} - \dfrac{1}{2} \right] * n0$ |
| A2, B2, C2 | $n2 = \left[ \dfrac{3}{4 * \sin(\pi/18)^2} - 2 \right] * n0.$ |

\* \* \* \* \*